C. G. LAYTON.
TRAP.
APPLICATION FILED JULY 20, 1918.

1,296,407.

Patented Mar. 4, 1919.
2 SHEETS—SHEET 1.

Witnesses

Inventor
C. G. Layton
By Victor J. Evans
Attorney

C. G. LAYTON.
TRAP.
APPLICATION FILED JULY 20, 1918.
1,296,407.
Patented Mar. 4, 1919.
2 SHEETS—SHEET 2.
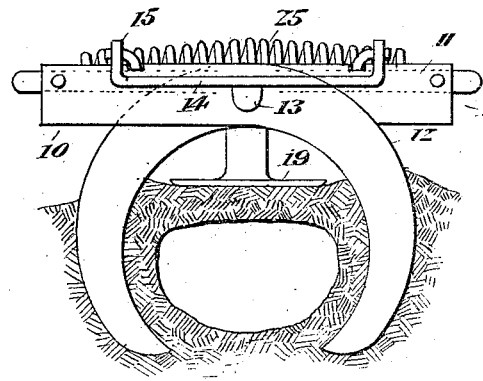
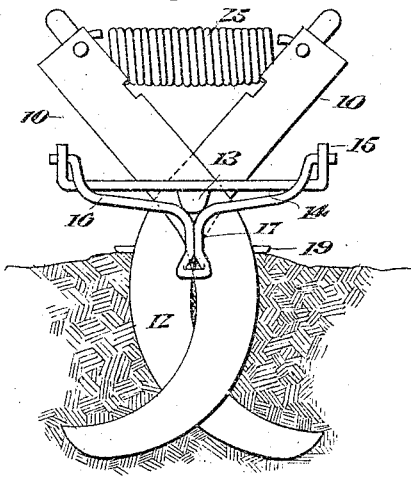
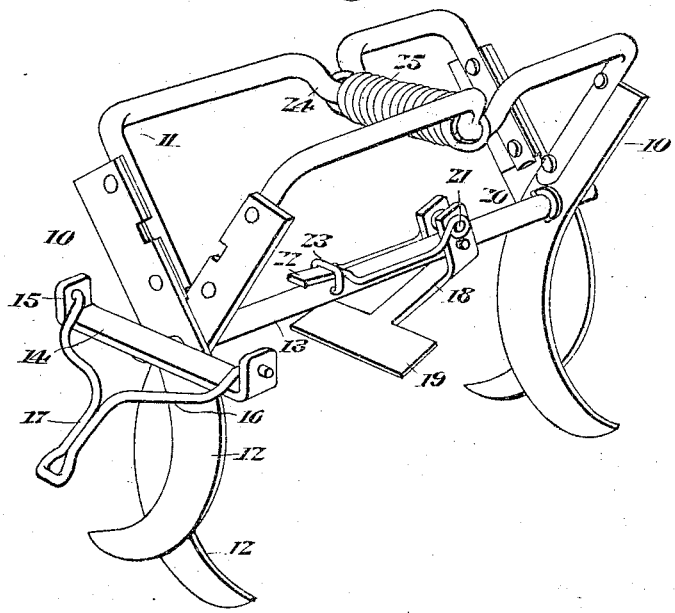
Witnesses
Inventor
C. G. Layton
By Victor J. Evans
Attorney

UNITED STATES PATENT OFFICE.

CHURCHILL G. LAYTON, OF ALBANY, OREGON.

TRAP.

1,296,407.

Specification of Letters Patent. Patented Mar. 4, 1919.

Application filed July 20, 1918. Serial No. 245,935.

*To all whom it may concern:*

Be it known that I, CHURCHILL G. LAYTON, a citizen of the United States, residing at Albany, in the county of Linn and State of Oregon, have invented new and useful Improvements in Traps, of which the following is a specification.

This invention relates to animal traps and is especially adapted for the purpose of catching moles.

An object of the present invention is to provide a trap having a pair of pivoted jaws at each end thereof which are adapted to be inserted in the earth in the track of the mole, the said trap including means for normally holding the jaws separated, said means including a trigger which is operated for the rising surface of the ground due to the passage of the mole, to release the jaws.

With the above and other objects in view the invention consists of the following novel features of construction, details and arrangement of parts to be hereinafter more fully described and illustrated in the accompanying drawings.

In the drawings:

Fig. 3 is an end elevation of the trap in position shown in Figs. 1 and 2, the surrounding earth being shown in section;

Fig. 4 is an end elevation of the trap after it has been sprung; and

Fig. 5 is a perspective view of the trap *per se* the trap being shown in set position.

Figure 1:
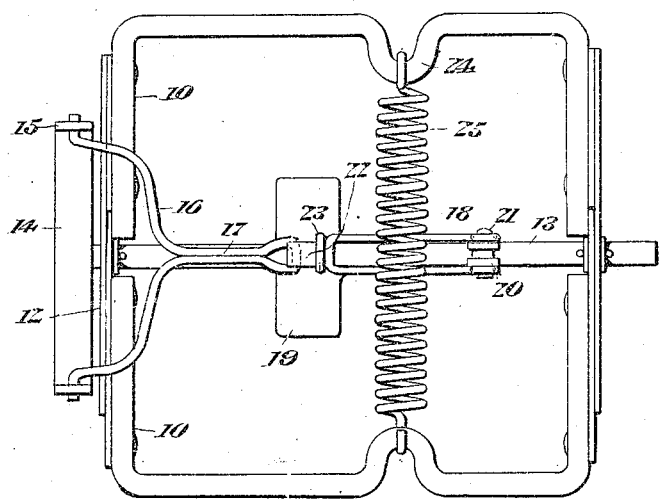
Figure 1 is a plan view of a mole trap in use.
Figure 2:
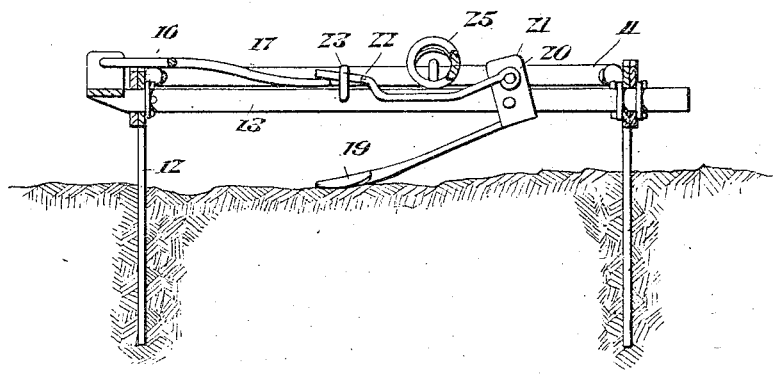
Fig. 2 is a central longitudinal sectional view of the same.

Referring to the drawings in detail the numeral 10 designates each of a pair of complemental members, each of said members including a frame 11 carrying at each end preferably curved jaws 12. The jaws of each frame are hinged in alinement and are parallel to one another and the frames are pivotally secured together with the jaws thereof overlapping and oppositely disposed through the medium of a pivot rod 13. This rod extends longitudinally of the frame and carries at one end a transversely disposed arm 14, the said arm being provided with angular extremities forming lugs 15. Pivotally mounted in each of these lugs are opposite ends of a yoke or bail 16, the said yoke having a centrally disposed arm 17, which, when the trap is set is adapted to extend inwardly substantially parallel with the pivot rod 13, with the arms of the yoke engaging each of the frames 11 to hold the latter separate and in a substantially horizontal position.

Pivotally mounted upon the pivot rod 13 is a trigger 18, the latter including an arm disposed longitudinally of the said pivot rod and terminating in a transversely extending foot 19. The trigger 18 also includes ears 20 which are adapted to embrace the pivot rod 13 and pivoted between these ears upon a pin 21 is a bar 22, the point at which the said bar is pivoted, resulting in the bar being moved longitudinally of the pivot rod 13 when the trigger 18 is moved upon its pivot. Secured to the rod 13 is a loop 23, which extends around the bar 22 for the purpose of limiting the pivotal movement of the bar.

Each of the frames 11 is provided with a loop portion 24, which is adapted to engage one end of a coil spring 25, the latter extending transversely across the rod 13 and acting to normally draw the frames 11 toward one another.

In the use of the trap, the jaws 12 are separated by moving the frames 11 upon the pivot bar and the yoke or bail 16 is swung inwardly toward the said bar to engage notches 26 in the jaws, where its extremity is engaging by the longitudinally movable bar 22, thereby holding the frames 11 in a substantially alined position with the extremities of the jaws 12 separated. The jaws 12 are then inserted in the ground around the passage formed by the mole, the depth of insertion being such as to permit the foot 19 of the trigger to rest lightly upon the surface of the ground, the said surface being first lightly tamped to depress the soil. The mole in retraversing the passage will raise this slightly tamped surface and consequently raise the trigger to release the arm 17 of the yoke, whereupon the spring 25 will suddenly force the jaws together to grip the mole. The distance between the opposite ends of the trigger is such that the animal will reach the point at which the trigger is located before passing entirely out of the jaws through which he has entered.

The invention is susceptible of various changes in its form, proportions and minor details of construction, and the right is reserved to make such changes.

Having described the invention, what is claimed is:—

1. A trap embodying a pair of complemental members, each including a pair of alined oppositely disposed parallel jaws, a pivot rod extending through said jaws in a manner to pivot the two members together with the jaws of one member in contact with the jaws of the other member, means carried by one end of the pivot rod and capable of being swung into position between the jaws to hold the latter separated, a trigger engageable with said holding means and means for automatically causing the blades to assume an overlapping position upon the operation of the trigger.

2. A trap embodying a pair of complemental members, each including a pair of alined oppositely disposed parallel jaws, a pivot rod extending through said jaws in a manner to pivot the two members together with the jaws of one member in contact with the jaws of the other member, means for holding the extremities of the jaws separated, a trigger pivoted upon the pivot rod and engageable with said holding means and means for automatically causing the blades to assume an overlapping position upon the operation of the trigger.

3. A trap embodying a pair of complemental members, each including a pair of alined oppositely disposed parallel jaws, a pivot rod extending through said jaws in a manner to pivot the two members together with the jaws of one member in contact with the jaws of the other member, means for holding the extremities on the jaws separated, a trigger pivoted upon the pivot rod and including a bar slidable horizontally of said rod for holding the jaws separated and means for automatically causing the blades to assume an overlapping position upon the operation of the trigger.

In testimony whereof I affix my signature.

CHURCHILL G. LAYTON.

Copies of this patent may be obtained for five cents each, by addressing the "Commissioner of Patents, Washington, D. C."